United States Patent
Tsai et al.

(10) Patent No.: US 8,614,163 B2
(45) Date of Patent: Dec. 24, 2013

(54) POROUS OBJECT OF RANEY METAL, PROCESS FOR PRODUCING THE SAME, AND CATALYST

(75) Inventors: Anpang Tsai, Ibaraki (JP); Satoshi Kameoka, Miyagi (JP); Tomofumi Kimura, Miyagi (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 13/063,976

(22) PCT Filed: Mar. 25, 2009

(86) PCT No.: PCT/JP2009/055998
§ 371 (c)(1), (2), (4) Date: Jun. 1, 2011

(87) PCT Pub. No.: WO2010/032508
PCT Pub. Date: Mar. 25, 2010

(65) Prior Publication Data
US 2011/0281723 A1    Nov. 17, 2011

(30) Foreign Application Priority Data

Sep. 22, 2008 (JP) .................... 2008-242965

(51) Int. Cl.
*B01J 25/00* (2006.01)
*B01J 23/00* (2006.01)
*B01J 21/00* (2006.01)

(52) U.S. Cl.
USPC .......... 502/301; 502/326; 502/329; 502/331; 502/337; 502/355; 502/415; 502/439

(58) Field of Classification Search
USPC ......... 502/301, 355, 415, 439, 326, 329, 331, 502/337
See application file for complete search history.

(56) References Cited

U.S. PATENT DOCUMENTS

| | | | |
|---|---|---|---|
| 2,673,189 A * | 3/1954 | Reynolds et al. ............. | 502/301 |
| 3,431,220 A * | 3/1969 | Batzold ........................ | 502/325 |
| 3,443,171 A * | 5/1969 | Knott et al. .................. | 257/126 |
| 3,448,060 A * | 6/1969 | Mason .......................... | 502/301 |
| 4,153,578 A * | 5/1979 | De Thomas et al. .......... | 502/200 |
| 4,214,954 A * | 7/1980 | Kuo .............................. | 205/111 |
| 4,224,248 A * | 9/1980 | Birkenstock et al. ......... | 564/422 |
| 4,240,895 A * | 12/1980 | Gray ........................ | 204/290.13 |

(Continued)

FOREIGN PATENT DOCUMENTS

| | | |
|---|---|---|
| JP | 2-258064 | 10/1990 |
| JP | 5-253486 | 10/1993 |

OTHER PUBLICATIONS

International Search Report issued May 12, 2009 in International (PCT) Application No. PCT/JP2009/055998.

*Primary Examiner* — Cam N. Nguyen
(74) *Attorney, Agent, or Firm* — Wenderoth, Lind & Ponack, L.L.P.

(57) ABSTRACT

A Raney-type metal porous material of which at least the inner surface of the pores constituting the porous structure is an alloy of the skeletal metal constituting it and a metal differing from the skeletal metal. The invention has made it possible to alloy a Raney-type metal with a porous structure, to realize a novel method of enabling remarkable enhancement of the function and the activity of the alloy based on the porous structure thereof, and to use the alloy as catalysts, etc.

1 Claim, 6 Drawing Sheets

(56) References Cited

U.S. PATENT DOCUMENTS

| | | | |
|---|---|---|---|
| 4,251,478 A * | 2/1981 | Welch et al. | 205/534 |
| 4,278,568 A * | 7/1981 | Lohrberg et al. | 502/301 |
| 4,287,096 A * | 9/1981 | Golden et al. | 502/301 |
| 4,323,595 A * | 4/1982 | Welch et al. | 427/456 |
| 4,370,361 A * | 1/1983 | Gray | 148/527 |
| 4,375,003 A * | 2/1983 | Allain et al. | 564/492 |
| 4,499,204 A * | 2/1985 | Vanderspurt et al. | 502/301 |
| 4,510,034 A * | 4/1985 | Ohshima et al. | 204/284 |
| 4,572,770 A * | 2/1986 | Beaver et al. | 205/532 |
| 4,584,085 A * | 4/1986 | Beaver et al. | 204/290.09 |
| 4,584,139 A * | 4/1986 | Gray et al. | 554/144 |
| 4,760,041 A * | 7/1988 | Beaver et al. | 502/101 |
| 4,824,482 A * | 4/1989 | Baldi | 148/279 |
| 4,826,799 A * | 5/1989 | Cheng et al. | 502/301 |
| 4,857,153 A * | 8/1989 | Divisek et al. | 205/112 |
| 4,970,094 A * | 11/1990 | Byrd | 427/126.5 |
| 5,645,930 A * | 7/1997 | Tsou | 428/328 |
| 5,801,286 A * | 9/1998 | Besson et al. | 564/490 |
| 5,840,989 A * | 11/1998 | Cordier et al. | 564/490 |
| 5,882,723 A * | 3/1999 | Tsou | 427/125 |
| 6,051,117 A * | 4/2000 | Novak et al. | 204/252 |
| 6,051,528 A * | 4/2000 | Ma et al. | 502/207 |
| 6,121,188 A * | 9/2000 | Breitscheidel et al. | 502/301 |
| 6,156,694 A * | 12/2000 | Harper | 502/301 |
| 6,265,451 B1 * | 7/2001 | Zhou et al. | 518/700 |
| 6,277,895 B1 * | 8/2001 | Zhou et al. | 518/715 |
| 6,309,758 B1 * | 10/2001 | Schmidt | 428/570 |
| 6,368,996 B1 * | 4/2002 | Mu et al. | 502/301 |
| 6,395,403 B2 * | 5/2002 | Schmidt | 428/570 |
| 6,794,331 B2 * | 9/2004 | Ostgard et al. | 502/301 |
| 7,488,547 B1 * | 2/2009 | Iacovelli | 429/434 |
| 7,569,513 B2 * | 8/2009 | Schmidt | 502/326 |
| 7,709,541 B2 * | 5/2010 | Lu et al. | 518/718 |
| 8,298,985 B2 * | 10/2012 | Morgenstern et al. | 502/345 |
| 2002/0010087 A1 * | 1/2002 | Zhou et al. | 502/301 |
| 2003/0004059 A1 * | 1/2003 | Haake et al. | 502/301 |
| 2008/0015267 A1 * | 1/2008 | Lu et al. | 518/718 |
| 2008/0194401 A1 * | 8/2008 | Schmidt | 502/337 |

* cited by examiner

POROUS OBJECT OF RANEY METAL, PROCESS FOR PRODUCING THE SAME, AND CATALYST

This application is a U.S. national stage of International Application No. PCT/JP2009/055998 filed Mar. 25, 2009.

BACKGROUND OF THE INVENTION

1. Field of the Invention

The present invention relates to a novel Raney-type metal porous material and its production method, and further relates to its use as a catalyst.

2. Description of Related Art

Heretofore, based on the characteristic function and activity thereof, Raney-type metals have been investigated for their application to electrode materials, catalysts, etc. For example, regarding electrode materials, there are proposed porous Raney metals of which the surface area has been increased, and those of which the surface including the inner surface of the pores therein has been coated or plated with a different type of metal or alloy to thereby enhance the durability and the activity thereof (Patent References 1 to 3).

Regarding catalysts, for example, it is proposed to prepare a Raney-type Cu—Ni—Zn catalyst by developing a Cu—Ni—Zn alloy with an alkali solution followed by alloying it through hydrogen gas reduction, and to use it as a catalyst for methanol reforming (Patent Reference 4).

However, for Raney-type metals, it is difficult to constitute porous structure-having alloys that have heretofore been investigated; and in fact, no one has heretofore succeeded in developing a practicable method of enhancing the function and the activity of the metals based on the porous structure thereof. Regarding use as catalysts, the relationship between the porous structure that is considered effective in point of increasing the surface area and the catalytic activity thereof is as yet investigated little in the art.

In fact, non-supported porous metal catalysts such as typically Raney-type catalysts have been known through the ages. Of an ordinary supported catalyst, the ingredient that takes actual catalytic activity thereof accounts for only a few percentage of the surface area of the entire catalyst; while on the other hand, a Raney catalyst is efficient in that the entire surface area thereof exhibits catalytic activity. However, almost all conventional Raney catalysts are single metal catalysts, and therefore have a serious problem with thermal stability in that at a high temperature at which the catalytic reaction goes on, the surface area of the catalyst greatly reduces owing to sintering. Regarding supported catalysts, it is possible to produce alloy catalysts of which the composition differs from that of metals, according to an impregnation method or coprecipitation method of using different types of metal salts; however, almost all conventional Raney catalysts are single metal catalysts. Accordingly, Raney catalysts are expected to have only the catalytic function of a single metal alone.

In the known technique for the above-mentioned Cu—Ni—Zn Raney-type catalyst composed of different types of metals, any substantial investigation about the alloy formation and the porous structure is not made. In the case of this catalyst, the three-dimensional alloy of Ni—Cu—Zn is processed for leaching therefore forming a significant concentration fluctuation (inhomogeneousness) of the ingredients, and composition control and porous structure formation for increasing the surface area would be substantially difficult. Therefore, the technique is problematic in that it lacks developability and practicability.

[Patent Reference 1] JP-A 11-111304
[Patent Reference 2] JP-A 58-46553
[Patent Reference 3] JP-A 59-94377
[Patent Reference 4] JP-A 63-256136

In the background as above, the present invention is to make it possible to alloy a Raney-type metal with a porous structure, to realize a novel method of enabling remarkable enhancement of the function and the activity of the alloy based on the porous structure thereof, and to use it for solving the problem with thermal stability of conventional Raney catalysts and for enhancing the catalytic function thereof and adding further diversity thereto.

BRIEF SUMMARY OF THE INVENTION

The present invention is characterized by the following, for solving the above-mentioned problems.

First: A Raney-type metal porous material of which at least the inner surface of the pores constituting the porous structure is an alloy of the skeletal metal constituting it and a metal differing from the skeletal metal.

Second: A method for producing the Raney-type metal porous material, which comprises at least the following steps:

(1) A step of applying onto or infiltrating into a Raney-type metal porous material formed of a skeletal metal, a solution of a metal salt of a metal that differs from the skeletal metal.

(2) A step of heating the resulting coated material or infiltrated material to reduce the metal salt, thereby forming an alloy of the skeletal metal and the metal constituting the metal salt in the inner surface of the pores of the Raney-type metal porous material.

Third: A catalyst comprising the above first Raney-type metal porous material as the catalyst active ingredient.

As described above, the invention makes it possible to alloy a Raney-type metal with a porous structure and, based on the porous structure thereof, makes it possible to remarkably enhance the function and the activity of the Raney-type metal porous material as catalysts, electrode materials, etc. In addition, the invention solves the problem with thermal stability of Raney catalysts and can provide improvement and diversification of the catalytic function and activity of the catalysts.

DETAILED DESCRIPTION OF THE INVENTION

In the Raney-type metal porous material of the first aspect of the invention, at least the inner surface of the pores constituting the porous structure is an alloy of the skeletal metal constituting it and a metal differing from the skeletal metal. Specifically, a part or all of the inner surface of the pores is an alloy of the skeletal metal constituting the porous structure having the pores and a metal differing from the skeletal metal, or along with a part or all of the inner surface of the pores and not limited to the inner surface of the pores, the porous material is formed of an alloy of the skeletal metal constituting the porous structure having the pores and a metal differing from the skeletal metal.

It may be said that the Raney-type metal porous material of the invention is, as a whole, a porous material that is partly or entirely alloyed, and at least a part or all of the inner surface of the pores is alloyed.

The production method includes at least the above-mentioned steps (1) and (2), and its embodiment is considered to comprise, for example, the following steps.

Specifically, an alloy of a metal A soluble in acid or alkali and a metal B insoluble in acid or alkali is prepared according to a dissolution method to have a composition typically represented by a chemical formula of A×B (x=1 to 10) (A: Al, B: Fe, Co, Ni, Cu, Ru, Rh, Pd, Ag, Pt, Au), then heat-treated and ground, and thereafter the alloy powder is impregnated in an acid or alkaline liquid to remove the metal A according to a Raney method (leaching), thereby giving a porous metal B powder. This is the first step.

In the second step, for example, an aqueous solution of a metal salt including a metal element C (C: Fe, Co, Ni, Cu, Ru, Rh, Pd, Ag, Pt, Au, Zn) applied to or infiltrated into the thus-obtained porous metal B power to thereby make the metal element held by the pores of the porous metal B powder. Subsequently, the coated or infiltrated, supported metal alloy powder is heat-treated in a hydrogen atmosphere for alloying the metal B and the metal C. This is the third step. Accordingly, a porous alloy powder having a high specific surface area and comprising two types of metals of B and C is produced. For controlling the alloy composition, the second step and the third step are repeated.

The alkaline solution in the first step may be any of various aqueous alkaline solutions of, for example, typically NaOH or KOH, or other various solutions such as water/alcohol solutions, etc. The same may apply to the aqueous solution of the metal salt in the second step. Usable are various water-soluble substances such as metal chlorides, organic salts, complex salts and others, as well as water-base solutions thereof. The processing condition in the third step may be determined in consideration of the type of the metals and the degree of alloying thereof, etc.

By selecting the condition in the above steps, especially by selecting the amount (concentration) of the metal salt to be used for coating or infiltration and by selecting the condition of the subsequent heat treatment (firing in a hydrogen atmosphere), the degree in alloying to give the intended Raney-type metal porous material shall be determined.

According to the production method of the invention, there can be easily produced binary Raney-type metal porous materials such as typically Ni—Cu, Ni—Zn, Co—Cu, Fe—Ni, Fe—Co, Ni—Pd, Ni—Ru, Ni—Pt, Fe—Cu, Fe—Rh, Fe—Pd, Cu—Ag, etc.; and also ternary ones such as Ni—Cu—Pd, Ni—Cu—Co, Ni—Co—Rh, Ni—Fe—Ag, Co—Ru—Ag, etc.; and other more polynary Raney-type metal porous materials.

The Raney-type metal porous material of the invention is by itself usable as electrode materials and catalysts, and in addition, when its surface including the surface of the pores thereof is coated or plated with any other metal or alloy, or when an inorganic substance is stuck thereto, then the resulting materials can exhibit further various functions and activities.

For example, as demonstrated in Examples, the Raney-type metal porous material of the invention is useful as a catalyst for methanol reforming or decomposition reaction, which has a large surface area and a high activity and has good heat resistance. It has been confirmed that the catalyst has an extremely high CO (carbon monoxide) selectivity. For example, the catalyst of the Raney-type metal porous material of the invention does not have any selectivity to $CO_2$ in methanol-water vapor reforming reaction but has a high reaction selectivity to CO (carbon monoxide); and the catalyst has a high selectivity to CO (carbon monoxide) in methanol decomposition reaction (to produce $H_2$ and CO). Thus, the Raney-type metal porous material of the invention has such remarkable characteristics.

Examples are given below, by which the invention is described in more detail. Needless-to-say, the invention is not limited to those Examples.

Example 1

Figure 1:
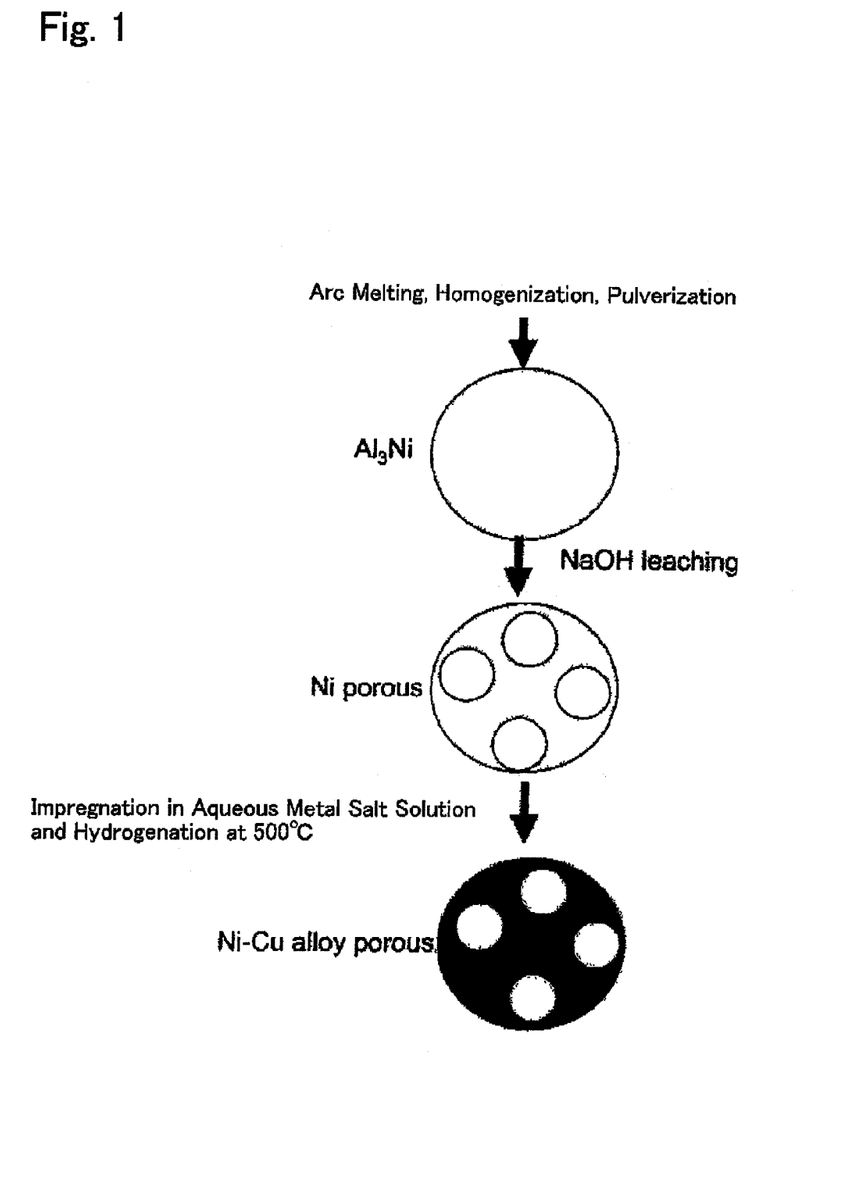
FIG. 1 shows one embodiment of the production method of the invention.

FIG. 1 schematically shows a production process. According to the process in FIG. 1, first, pure Al and pure Ni prepared as samples were arc-melted, then sealed up in vacuum, and annealed at 700° C. for 24 hours. Subsequently, this is milled into a fine powder, and then put in an NaOH solution (20% by weight, 12 hours) for dissolving Al alone to give a Raney-type Ni. A salt $CuCl_2$ was infiltrated into it so as to add Cu thereto, and then this was alloyed in a hydrogen atmosphere (500° C., 12 hours).

Through the process, there were produced a Raney-type metal porous material having an atomic number ratio Ni/Cu=5/1, and a Raney-type metal porous material with Ni/Cu=1/1.

Figure 2:
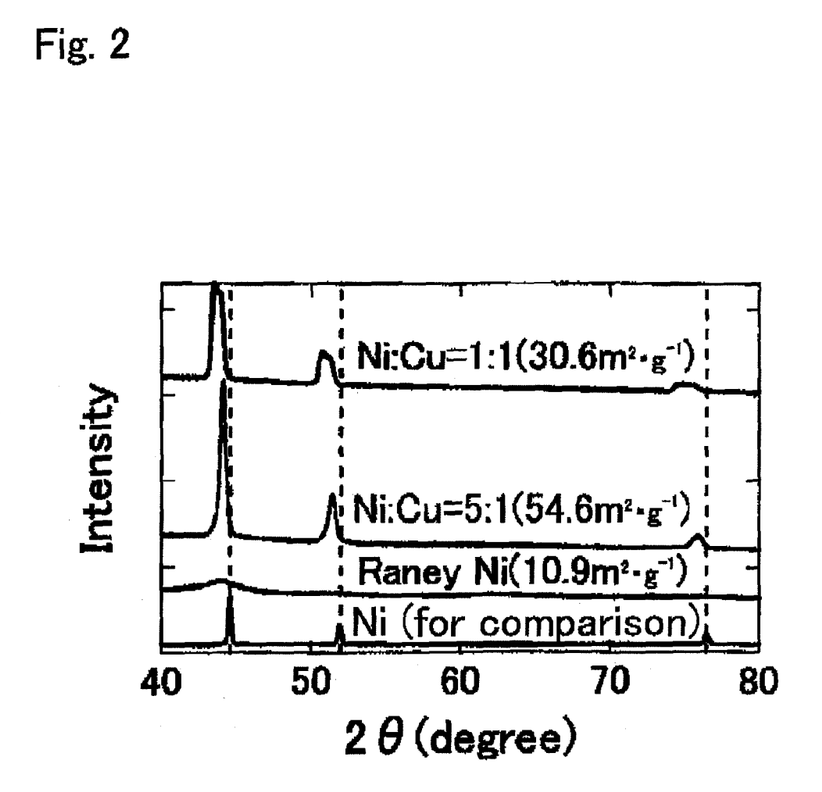
FIG. 2 is a view showing the data in XRD and the surface area of the Raney-Type Ni—Cu porous material in Example 1 and comparative Ni.

As in FIG. 2 showing the results of XRD, both the samples with the atomic number ratio Ni/Cu=5/1 or 1/1 had the peak position shifted toward the low angle side, which confirmed the formation of a solid solution of Ni—Cu. In addition, the alloying formed mesopores having a large surface area.

Example 2

A Raney-type metal porous material having an atomic number ratio Cu/Ni=1/1 was produced in the same manner as in Example 1, except that a pure Cu was used in place of the pure Ni and that a salt $NiCl_2$ was used in place of the salt $CuCl_2$.

As a result of XRD analysis, the formation of a Cu—Ni solid solution was confirmed like in Example 1; and it was also confirmed that the alloying formed mesopores having a large surface area.

Example 3

In the same manner as in Example 1, an ingot of an Al-based intermetallic compound $Al_3Ni$ (or $Al_2Cu$) was produced according to an arc melting method in an Ar atmosphere, then annealed and single-phased, and thereafter this was milled according to a ball milling method to prepare a fine powdery sample. The sample was processed in an aqueous 20% NaOH solution for selective leaching treatment to produce a porous metal catalyst. This was impregnated in an aqueous solution of a Cu-containing metal salt, $CuCl_2$ so as to carry it, then dried and alloyed (in $H_2$, at 500° C. for 12 hours). Of the obtained Raney-type metal porous material, the alloy having an atomic number ratio of Ni/Cu=5/1 was evaluated for the catalytic performance thereof in methanol-water vapor reforming reaction. For the reaction, used was an ordinary-pressure fixed bed circulation reactor, and methanol was introduced into the catalyst layer via a micropump (LHSV=30 h$^{-1}$). The product was analyzed through on-line GC (TCD).

Figure 3:
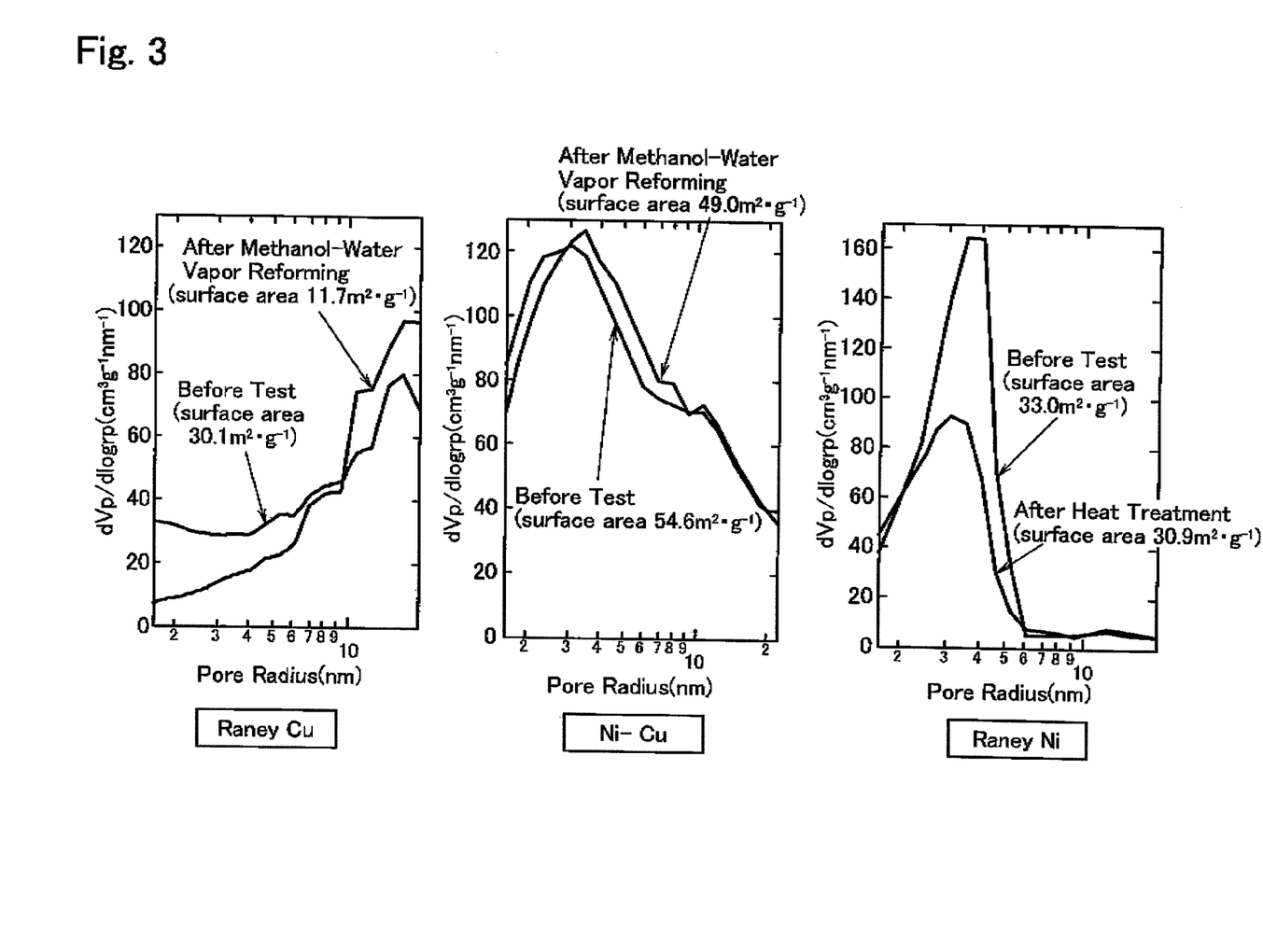
FIG. 3 is a view showing the found data of the BET surface area before and after methanol/water vapor reforming reaction in Example 3.

FIG. 3 shows the BET surface area before and after reaction of conventional Raney Cu and Raney Ni, and the porous Ni—Cu alloy produced in the above, used in methanol-water vapor reforming reaction ($CH_3OH+H_2O \rightarrow 3H_2+CO_2$). After the methanol-water vapor reforming reaction, it was confirmed that the surface area of Raney Cu greatly reduced, and that, though there was no significant change in the surface area of Raney Ni, the pores having a peak at 3 nm reduced therein. On the other hand, there was little change In the surface area and in the pore size distribution of the Ni—Cu porous alloy after the methanol-water vapor reforming reaction. These results confirm high thermal stability of the Ni—Cu porous alloy.

Figure 4:
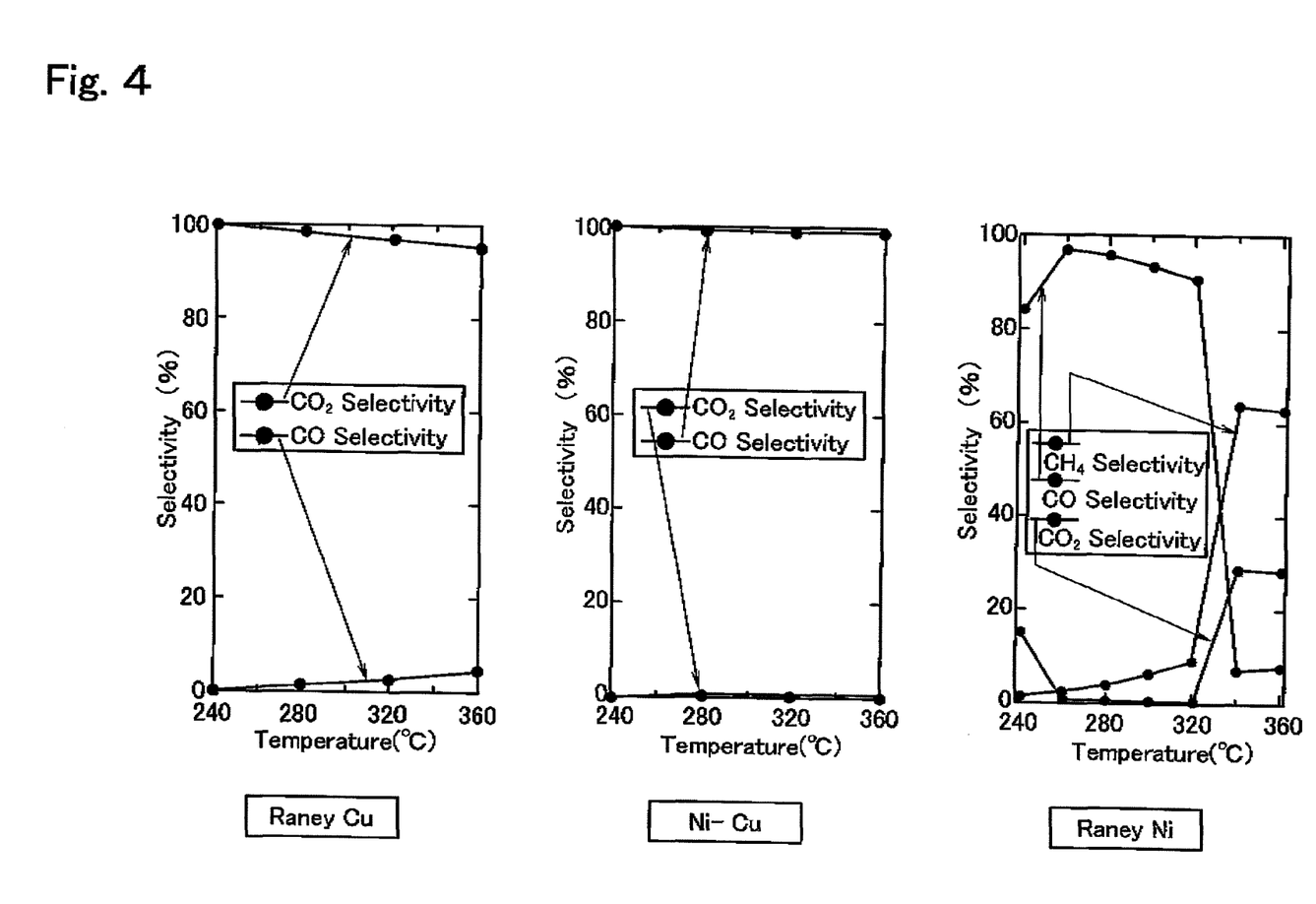
FIG. 4 is a view showing the data of the reaction selectivity in methanol/water vapor reforming reaction in Example 3.

FIG. 4 shows the reaction selectivity in the water vapor reforming reaction of the above three samples. Raney Cu is known as a catalyst for methanol-water vapor reforming reaction; however, as shown in the left-side view in FIG. 4, only $H_2$ and $CO_2$ are formed, and the $CO_2$ selectivity ($CO_2/(CO_2+CO)$) reached around 100%, while on the other hand, the CO selectivity is nearly 0%. Raney Ni is shown in the right-side view in FIG. 4. This has a high CO selectivity at a low temperature, but with methanation to give methane ($CH_4$) at about 320° C., the methane selectivity increased. The selectivity change characterizes the Ni catalyst, of which the catalyst property is contrary to that of the Raney Cu catalyst. On the other hand, the porous Ni—Cu alloy of the invention (the center view in FIG. 4) had almost 100% CO selectivity in the entire temperature range, or that is, it has 0% $CO_2$ selectivity. The reaction conversion ratio was 6.7% (240° C.), 14.5% (280° C.), 26.5% (320° C.), 42% (360° C.).

From the above results, it is known that the selectivity of the porous Ni—Cu alloy significantly differs from that of Raney Cu and Raney Ni. This means that the porous Ni—Cu alloy exhibits a catalytic function quite differing from that of Ni and Cu.

Example 4

In the same manner as in Example 1, Raney-type Ni was produced, then a salt &Cl was infiltrated thereinto (100° C.) for alloying. Accordingly, there was produced an alloy having an atomic number ratio Ni/Zn=7/1 and Ni/Zn=1/1.

Figure 5:
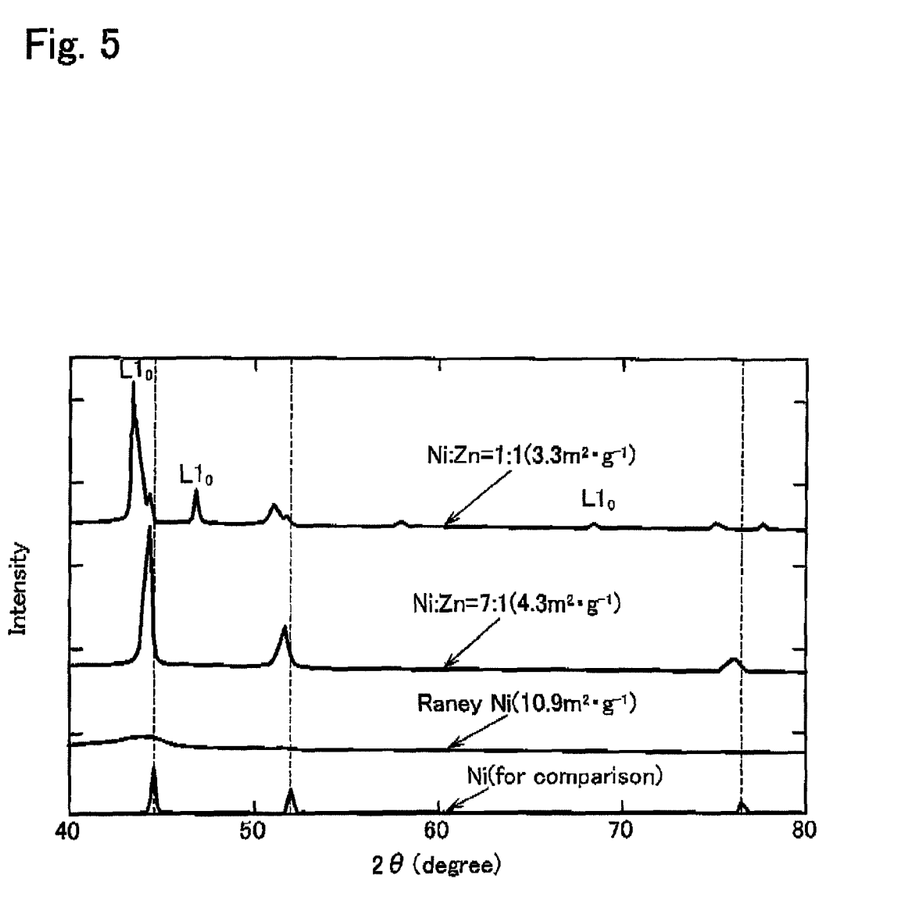
FIG. 5 is a view showing the data in XRD and the surface area of the Ni—Zn alloy in Example 4 and comparative Ni.

The XRD data shown in FIG. 5 confirm shifting of the peak position to the low angle side and solid solution of Zn in the alloy. The case of Ni/Zn=1/1 confirmed $L1_0$ structure. In addition, it was known that the Ni—Cu alloy had a large surface area.

The alloy with Ni/Zn=7/1 was used as the catalyst in methanol decomposition reaction ($CH_3OH \rightarrow CO+2H_2$). For the reaction, used was a fixed bed circulation reactor. After pretreatment in an H2 gas atmosphere (240° C.) for 1 hour, a reaction gas of methanol/$N_2$ (30 cm$^3$·min$^{-1}$) was introduced into the reactor and reacted at a temperature of 240° C. to 360° C.

Figure 6:
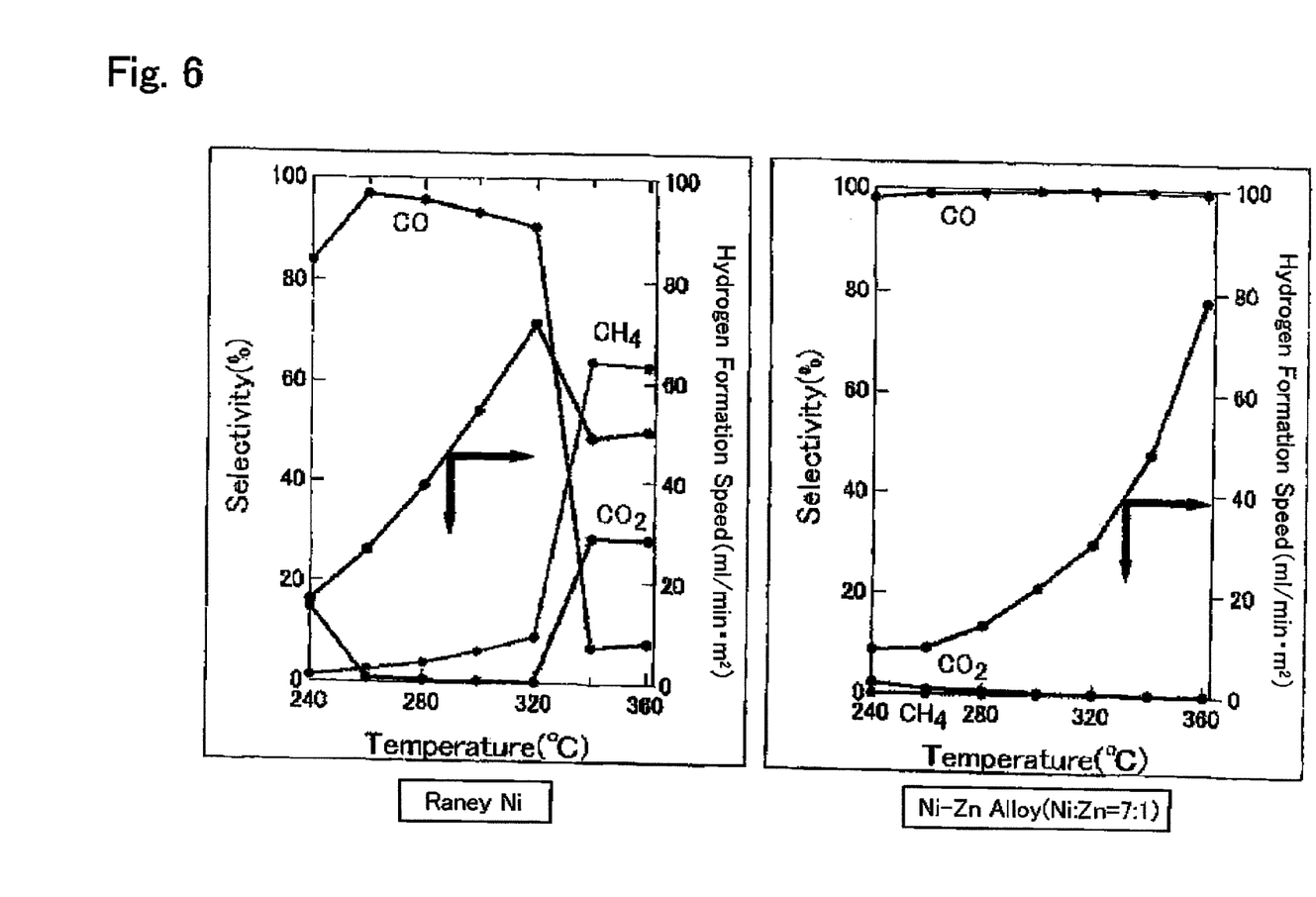
FIG. 6 is a view illustrating the data of methanol decomposition reaction in Example 4.

The result of the reaction is shown in FIG. 6, in which the data with Raney Ni are shown for comparison. The hydrogen formation speed is proportional to the temperature, and the catalyst was confirmed to have a high CO (carbon monoxide) formation selectivity; and it was also confirmed that the property of this catalyst quite differs from that of Raney Ni.

Example 5

In the same manner as in Example 1, a Raney-type metal porous material of Pd—Zn was produced. XRD analysis of the product confirmed solid solution of Pd—Zn therein,

The invention claimed is:
1. A method for producing a Raney-type metal porous material, which comprises:
(1) a step of coating onto or infiltrating into a Raney-type metal porous material formed of a skeletal metal of Ni defining pores having an inner surface, a solution of a metal salt of Cu or Zn;
(2) a step of heating in a hydrogen atmosphere the resulting coated material or infiltrated material to reduce the metal salt,
wherein an alloy consisting essentially of the skeletal metal of Ni and the metal constituting the metal salt is formed on the inner surface of the pores of the Raney-type metal porous material.

* * * * *